Dec. 31, 1968 H. SEIDEL 3,419,824
CONTINUOUSLY VARIABLE RESOLVER AND SYSTEMS USING THE SAME
Filed May 10, 1965 Sheet 1 of 3
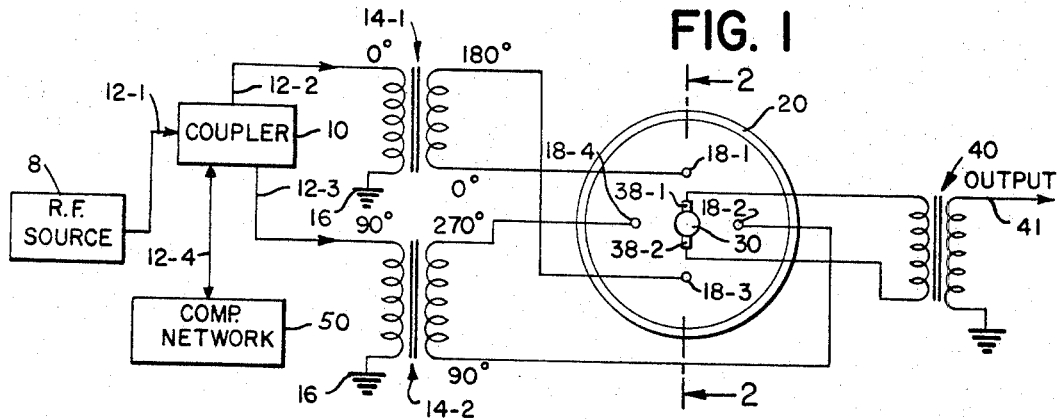
FIG. 1
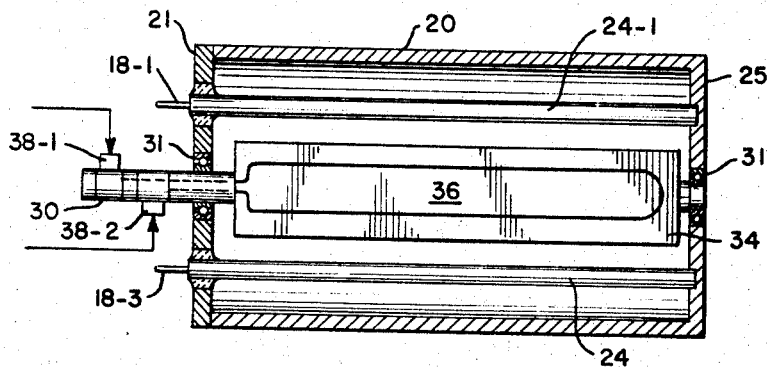
FIG. 2
FIG. 3
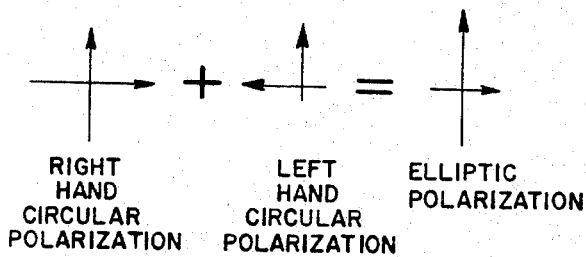
FIG. 4
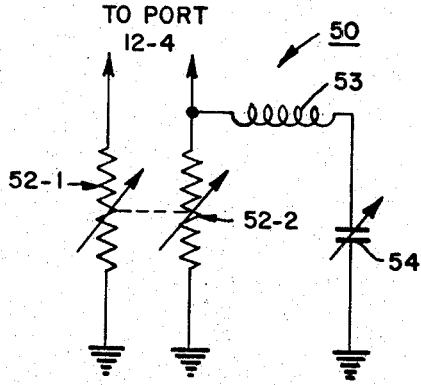
INVENTOR.
HAROLD SEIDEL
BY Darby & Darby
ATTORNEYS INVENTOR.
HAROLD SEIDEL
BY Darby & Darby
ATTORNEYS & # United States Patent Office 3,419,824
Patented Dec. 31, 1968

3,419,824
CONTINUOUSLY VARIABLE RESOLVER AND SYSTEMS USING THE SAME
Harold Seidel, Fanwood, N.J., assignor to Merrimac Research and Development Inc., Irvington, N.J., a corporation of New Jersey
Filed May 10, 1965, Ser. No. 454,494
13 Claims. (Cl. 333—24)

This invention relates to radio frequency devices and more particularly to a resolver for producing an output signal of any desired phase over a range of 0°–360°, and systems for using this resolver.

Many situations exist where it is desirable to have a device, hereafter called a resolver or variable phase shifter, for readily producing an output signal of any desired phase over a complete range of 0°–360°. The present invention relates to such a resolver in which an output signal is produced whose phase can be shifted by a selected amount in accordance with the mechanical rotation of a shaft to produce any desired change in phase of the output signal from 0°–360°.

In accordance with the resolver of the present invention a cavity is excited with energy in a manner to produce a polarized energy pattern containing all phases from 0°–360°. Energy at any selected phase is coupled out of the cavity as an output signal by an output loop and any selected change in the phase of the output signal can be effected by changing the angular position of the loop within the cavity.

In the preferred embodiment of the invention described a generally cylindrical cavity is used with four loops symmetrically placed therein. Each of the loops receives a respective input signal of a phase 0°, 90°, 180° and 270° and this input signal phase sequence excites a circularly polarized symmetric energy mode within the cavity containing all phases from 0°–360°. A loosely coupled and linearly polarized output loop inserted in the cavity couples out some of the cavity energy which is in its plane of polarization. Due to the circularly symmetric polarization, as the loop is rotated the phase of the signal coupled out of the cavity by the loop changes substantially identically with the change in the mechanical angle of loop orientation within the cavity.

The resolver of the present invention is used in one embodiment disclosed herein to measure the phase difference between two signals of the same, and relatively high, frequency. Here, a lower frequency analog of one of the signals of continuously variable phase is produced by using this one signal as the resolver input and continuously rotating the resolver ouput shaft. The continuously variable phase output signal of the resolver is then mixed with the other signal and a selected electrical point on the combined mixed signal is monitored to measure the time (phase) difference between the two signals. In a preferred embodiment of this system disclosed herein, the phase difference between the two signals is directly read out in digital form.

It is therefore an object of the present invention to provide a continuously variable phase shifter for producing an output signal of any desired phase over a range of 0°–360°.

Another object is to provide a resolver having a cavity which is excited with energy in a circularly symmetric polarized mode and a linearly polarized output loop rotated within the cavity by a shaft to couple out a signal with a phase corresponding to the loop orientation within the cavity.

A further object is to provide a continuously variable resolver utilizing a cavity with four loops therein each of which is excited by energy which is respectively 90° different in phase from the energy of the next adjacent loop, this energy being coupled out by a plane polarized loop carried by a mechanically rotated shaft.

A further object is to provide a system for the measurement of the phase difference between two signals by continuously varying the phase of one of the signals at a lower frequency by a continuously variable resolver.

Other objects and advantages of the present invention will become more apparent upon refernce to the following specification and annexed drawings in which:

FIGURE 1 is a schematic diagram of the resolver of the present invention illustrating its general principles of operation;

FIGURE 2 is a sectional view of the resolver cavity;

FIGURE 3 is a diagram showing the energy polarization within the cavity;

FIGURE 4 is a schematic diagram of one form of compensation network for adjusting the polarization of the energy within the cavity;

Figure 5:
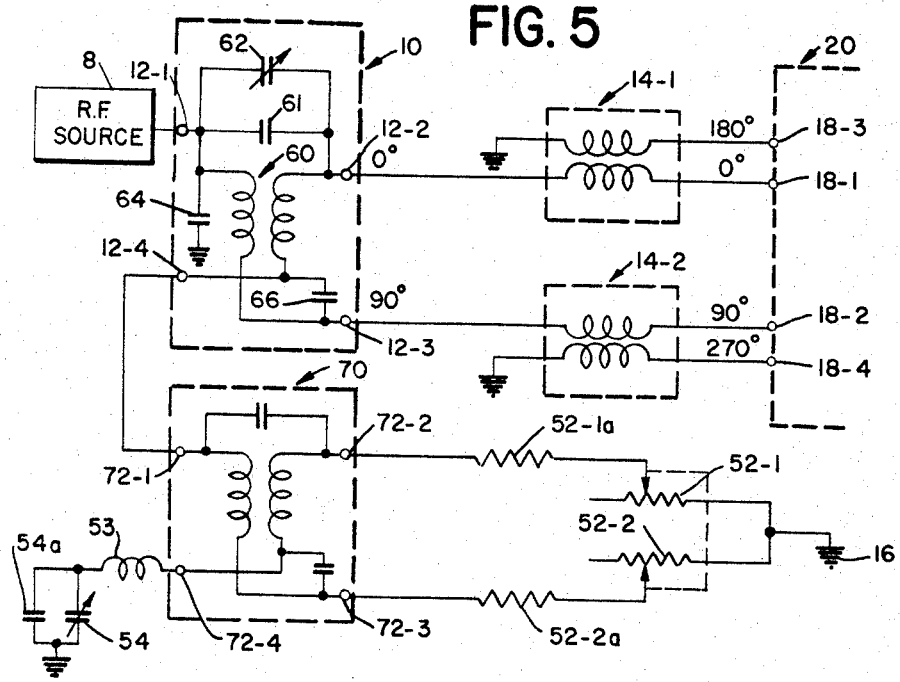
FIGURES 5, 6 and 7 are schematic diagrams showing details of various embodiments of the resolver.

FIGURES 1 and 2 illustrate the general principles of the resolver of the present invention. Here, energy from a suitable source of radio frequency energy 8, for example an oscillator, is applied to the input of radio frequency coupler 10. The coupler 10 is of conventional construction having four ports, which are: port 12–1, the input port; ports 12–2 and 12–3, the output ports across which energy appears equal in amplitude and in phase quadrature (90° phase shifted); and port 12–4, an isolated port.

The phase quadrature output signals from ports 12–2 and 12–3, which are designated as being at 0°–90° with respect to each other, are respectively applied to one end of the respective input windings of two balun transformers 14–1 and 14–2. The other end of each balun input winding is connected to a suitable point of reference potential such as ground 16. As is known, a balun is a radio frequency device for converting a single-ended input, here illustrated as one of the 0° or 90° signals on the lines from the ports 12–2 and 12–3, into a double ended output. The double ended output has two output signals displaced in phase by 180° with respect to each other.

As shown in FIGURE 1, two output signals are produced at the ends of the upper balun 14–1 in response to the input signal from coupler port 12–2 while two other output signals are produced at the ends of the lower balun 14–2 in response to the input signal from port 12–3. Since the two signals at output ports 12–2 and 12–3 are phase displaced by 90° with respect to each other, the output signals of the two baluns also have a corresponding phase displacement. Thus, the output signals of balun 14–1 are designated as 0° and 180° while the output signals of balun 14–2 are designated as 90° and 270°, i.e., shifted by 90° with respect to the output signals of balun 14–1. All phase shifts in the couplers and baluns are neglected from further consideration, since these remain constant, and only the four balun output signals of 0°, 90°, 180° and 270°, phase shifted with respect to each other, are discussed hereafter.

The four output signals of the baluns at phases of 0°, 90°, 180° and 270° with respect to each other are applied to the respective inputs 18–1 (0°), 18–2 (90°), 18–3 (180°) and 18–4 (270°) of a closed cavity 20. The cavity may be of any desired shape, for example cylindrical, and preferably is highly reflective so as not to destroy the field pattern produced therein. Each of the cavity inputs 18 is insulated from one end wall 21 of the cavity 20 by a suitable feed-thru insulator 22 which has connected thereto a respective substantially straight wire 24–1, 24–2, 24–3, and 24–4. The wires 24 are electrically connected to the respective inputs 18 and the other end wall 25 of the cavity. Thus, each wire 24 forms a loop between the wire, a portion of the end wall 25 and the outer wall of cavity 20.

A rotatable shaft 30, of either split or continuous construction, is supported at each end by bearings 31 in the end walls 21 and 25. Shaft 30 holds a form 34 of any suitable insulating material on which an output loop 36 is wound. The loop 36 comprises one or more turns of wire laid in a substantially flat plane on the form 34. The loop is effectively loosely coupled to the cavity and is made resonant at the frequency of the signals applied to the cavity. The diameter of the loop is made small, preferably less than ⅕ the radius from the axis of the cavity out to one of conductors 24, so that coupling is achieved only with those magnetic field lines near the axis. These are more nearly symmetrical. If desired, the wire may be wound directly on the shaft or extensions thereof, if either or both the wire and/or shaft are insulated, and the form 34 may be eliminated.

The ends of the output loop 36 are connected to the portion of a respective slip ring assembly 38–1 and 38–2 operative and rotatable with shaft 30. The outputs of the slip ring assemblies 38–1 and 38–2 are respectively connected to the upper and lower ends of another balun transformer 40 which converts the double-ended output of the loop 36 into a single ended output at terminal 41.

The phase shifted energies applied to the four input terminals 18 excite a wave within cavity 20. This wave has the principal mode and higher order modes of the input and a resultant wave having generally circular polarization is produced, particularly at the cavity axis. A small portion of this polarized energy is induced into the plane polarized loop 36 and coupled out to the balun transformer 40 to appear as an output signal at terminal 41 at a phase corresponding to the angular orientation of the shaft 30 that carries the loop. Any selected phase or change in phase of the output signal can be effected by changing the angular position of the rotatable shaft 30. The selected phase or change in phase can be quite accurately accomplished due to the presence of the circularly symmetric energy in the cavity 20 and the plane loop 36 which is readily positionable at any angle over the range from 0° to 360°.

Each of the balun transformers 14–1 and 14–2 has a substantially unity reflection coefficient and since the rotating loop 36 is loosely coupled to the cavity, a large portion of the input energy fed to the four stationary loops 24 is reflected back to the input coupler 10 and recombined at the isolated fourth port 12–4. In a perfect system, port 12–4 would be terminated in a dummy load at the characteristic impedance of the system. However, due to manufacturing tolerances, no system of this type is perfect. For example, system errors occur due to slight asymmetries in locating the four loops 21 or errors in the coupler 10. Both of these errors result in an elliptic energy polarization in the cavity rather than in the desired circularly symmetric polarization. Consequently, some type of compensating network 50 is provided at the isolated port 12–4 to remove the ellipticity.

As shown in FIG. 3 the elliptic polarization can be broken down into two components of circular polarization, one right-hand polarized and the other left-hand polarized. By suitably selecting and adjusting the compensating network 50 to adjust the magnitude and phase of the reflection coefficient at port 12–4 of coupler 10 the elliptic polarization can be corrected to produce the desired circular polarization.

FIG. 4 shows one form of compensating network 50 which includes two resistors 42–1 and 42–2, whose center movable arms are ganged together mechanically, and a series network, resonant at the input frequency, formed by an inductor 53 and a variable capacitor 54. By varying the value of the capacitor 54, the phase of the reflection at the port 12–4 of the coupler 10 can be varied and by adjusting the ganged resistors 52, the magnitude of the reflection can be varied. Stated another way, proper adjustment of the compensating network 50 feeds enough circularly polarized energy in the reverse sense of polarization and in the correct phase back into the system to cancel out the unwanted circularly polarized component or components causing the ellipticity.

It should be understood that the use of four signals in a 90° phase sequence, in a preferred embodiment of the invention described in FIGURES 1 and 2, is a relatively easy way of producing the circularly symmetric polarized mode within the cavity 20. As can be seen, this arrangement requires only the use of a quadrature coupler and two balun transformers to supply the cavity. Of course, any other suitable arrangement may be used to excite the circularly polarized mode of energy within the cavity, for example three signals phased shifted by 120° with respect to each other or a waveguide with a suitable polarizer. In any case, the plane polarized loop 36 can still couple out an output signal at any desired phase.

FIG. 5 shows the details of one embodiment of the resolver. Similar reference numerals have been used as in FIGS. 1 and 2, where applicable. The output from the source 8 is applied to the port 12–1 of the coupler 10. The coupler 10 is a conventional four port type, −3 db type which provides quadrature outputs, impedance matching and isolation at a desired radio frequency. As shown, the coupler is formed by a bifilar inductance 60 of the proper value whose upper ends are shunted by a fixed capacitor 61 and a variable capacitor 62. Adjustment of the capacitor 62 varies the impedance of the coupler and its coupling coefficient. Capacitor 64 is connected between the upper end of one of inductances and ground to match the coupler to the source. It should be understood that any suitable type of coupler may be utilized. Preferably, one port is made available for compensation to take care of system asymmetries.

The 0° phase energy signal is taken from the port 12–2 connected to the upper end of the right hand bifilar inductance winding 60 while the quadrature output signal, 90° phase shifted from the 0° signal at port 12–2 is taken from port 12–3 through a capacitor 66 connected to the lower end of the same winding.

The 0° phase output signal from port 12–2 is applied to one end of one (primary) winding of a balun transformer 14–1 and a first signal, here called 0° phase, is taken off the other end of this winding. Since the phase shift through the balun is constant it is unnecessary to consider it further. A second output signal phase shifted by 180° from the 0° signal at the output of the balun primary winding is produced at the ungrounded end of the other (secondary) winding of balun 14–1. As before, the 0° phase output signal is applied to input 18–1 of the cavity 20 and the 180° phase output applied to input 18–3. The quadrature phase signal from output port 12–3 of the coupler is applied to a similarly connected second balun 14–2, which produces a first output signal 90° phase shifted from the 0° output signal of balun 14–1 and a second output signal phase shifted by 270° from the 0° output signal of balun 14–1. The 90° signal is applied to input terminal 18–2 of the cavity 20 while the 270° signal is applied to input 18–4. In FIG. 3 neither the details of the cavity nor the coupling loop 36 are shown for the sake of clarity.

The compensating network 50 is connected to the isolated port 12–4 of coupler 10 through another coupler 70 which is similar to the coupler 10 of FIG. 5. The only difference between the two couplers is that a variable capacitor equivalent to capacitor 62 is omitted from coupler 70. In the coupler 70, the signals reflected by the baluns 14–1 and 14–2 are combined at the output port 12–4 which is connected directly to input port 72–1 of coupler 70. Coupler 70 has two quadrature output ports 72–2 and 72–3 to which are respectively connected resistive attenuating networks formed by series connected fixed and variable resistors 52–1 and 52–1a and 52–2 and 52–2a. The lower ends of variable resistors 52–1 and 52–2 are connected to the point of reference potential 16 and the center arms are ganged together. Fixed resistors 52–1a and 52–2a are provided to approach the proper terminating impedance for port 12–4 and the compensating network 50.

The series resonant network formed by inductor 53 and adjustable capacitor 54 are connected between coupler output port 72–4 and ground. A fixed capacitor 54a is connected in parallel with capacitor 54 to establish a reference capacity which is trimmed by capacitor 54. The network 53–54 is resonant at the frequency of the source 8.

As explained before, the ganged resistors 52–1 and 52–2 adjust the magnitude of the energy reflected back to coupler 10 while capacitor 54 of network 53–54 adjusts its phase. The adjustment is carried out to produce substantially circular symmetric polarization of the energy within cavity 20.

Figure 6:
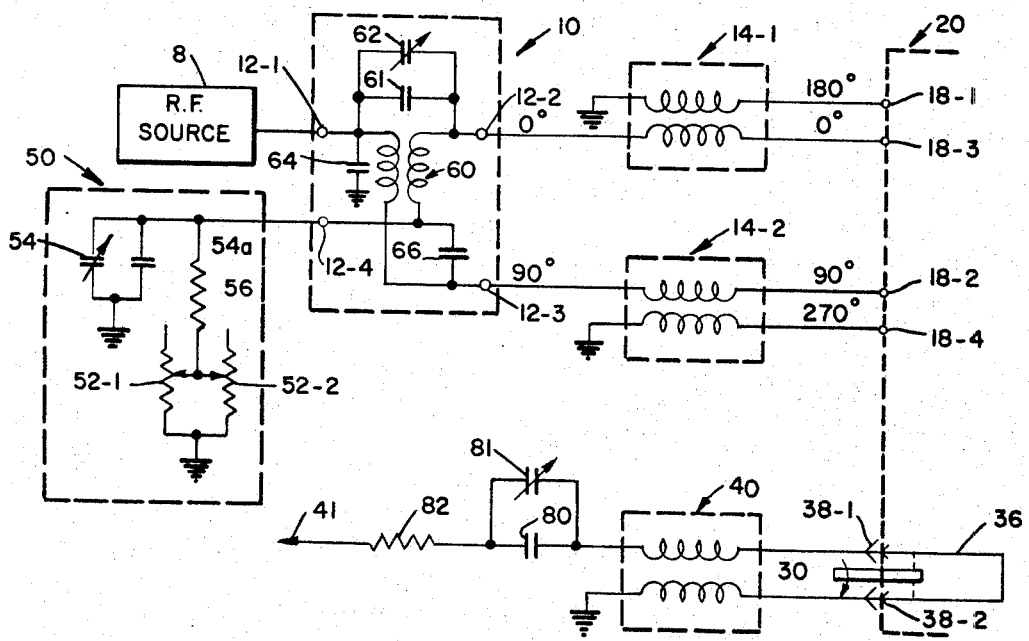

FIG. 6 shows another embodiment of the resolver which is similar in many respects to the resolver of FIG. 5. Here, the source 8 feeds a coupler 10, which is identical to that of FIG. 5, and the two balun transformers 14–1 and 14–2 produce the four output signals at 0°, 90°, 180° and 270° phases with respect to each other as previously described. In FIG. 6, a different compensating network is used which is simpler than the one of FIG. 5. Here, the coupler 70 is eliminated and a direct connection is made from output port 12–4 of coupler 10 to the electrically connected center arms 52–1 and 52–2 of the resistors through an impedance terminating and isolating resistor 56. Also, the inductor 53 is eliminated and series resonance at the frequency of the signal from source 8 is produced by the two capacitors 54 and 54a and the inductance of the connecting lead to port 12–4. As before, resistors 52–1 and 52–2 are adjusted to control the magnitude of the energy reflected back to coupler 10 while capacitor 54 is adjusted to control its phase.

An arrangement for coupling energy out of the cavity 20 via the loop 36 is also shown in FIG. 6 and this arrangement may also be used with the resolver of FIG. 5.

In FIG. 6, the output of the plane loop 36 is taken off through the slip ring assemblies 38–1 and 38–2 and respectively applied to one of the ends of the two windings of balun transformer 40. The other end of the balun winding receiving the signal from slip ring 38–2 is grounded. Parallel connected fixed capacitor 80 and variable capacitor 81 are connected in series with the single-ended output winding of balun 40. Capacitor 81 is adjusted to resonate the loop 36 substantially at the output frequency of the cavity. This maximizes the energy coupled out of the cavity. An impedance matching and isolating resistor 82 couples the output of the loop to terminal 41.

Figure 7:
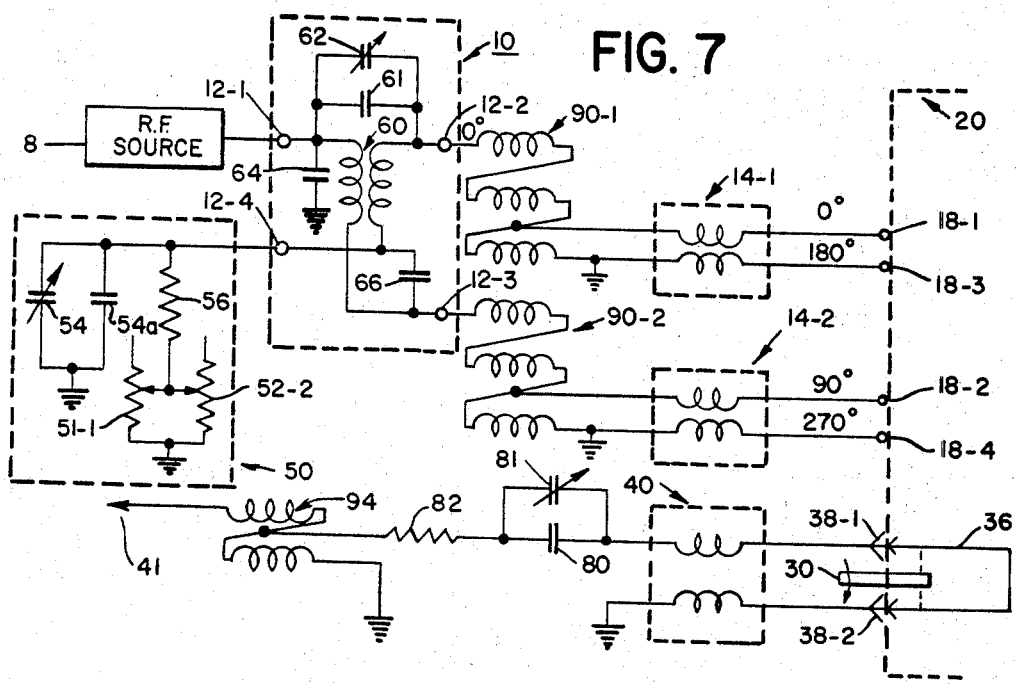

FIG. 7 shows another embodiment of the resolver in which a coupler 10 identical to that of FIGS. 5 and 6 and a compensating network 50 similar to that of FIG. 6 are used. Here, bifilar wound transformers 90–1 and 90–2 are used to couple the energy from output ports 12–2 and 12–3 of the coupler 10 to the baluns 14–1 and 14–2. As shown, the bifilar transformers 90–1 and 90–2 have a 3:1 winding (turns) ratio thereby giving a 9:1 impedance stepup. This puts more excitation energy into the cavity 20.

Similarly, another bifilar transformer 94 is used to couple the output from the loop 36 to the output terminal 41. As shown, bifilar transformer 94 has a 2:1 turns ratio thereby giving a 4:1 impedance stepup. This permits connection of the output loop to higher impedance loads with less loss of output signal energy. It should be understood that any suitable bifilar transformer may be utilized with any suitable stepup ratio for the transformers 90–1, 90–2 and 94.

The resolver of FIG. 7 operates substantially in the same manner as the resolvers of FIGS. 5 and 6, the main difference being the use of the bifilar transformers for input and output signal coupling to and from the cavity 20.

Figure 8:
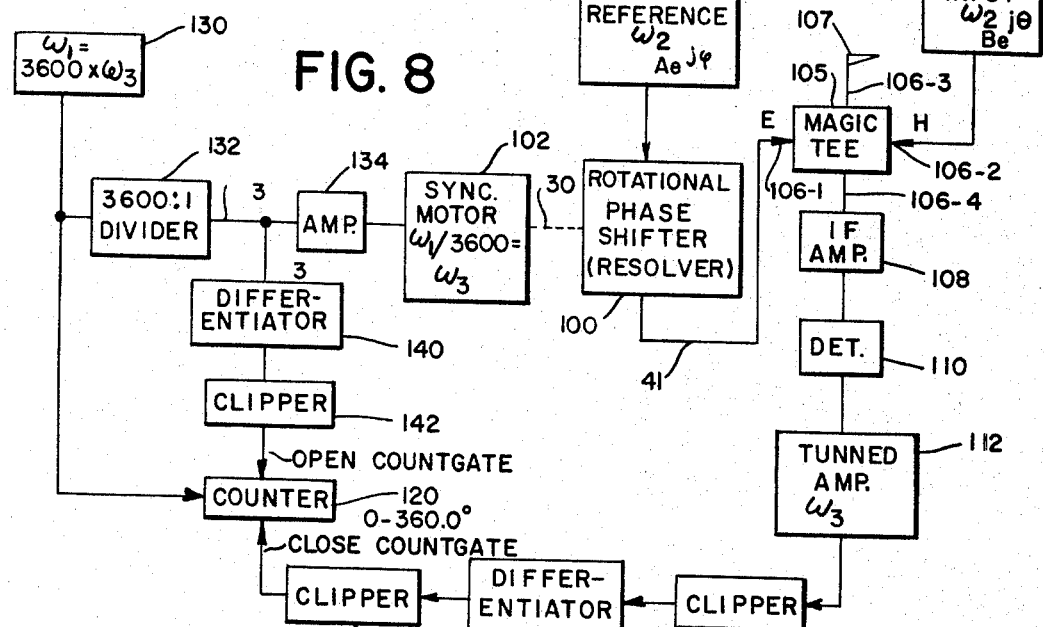
FIGURE 8 is a schematic diagram of a system using the resolvers of the present invention for measuring the phase difference between two signals.

FIG. 8 shows in schematic block diagram forms one system utilizing any of the resolvers of FIGS. 1–2 and 5, 6 or 7, for measuring the phase difference between a stable frequency and phase reference signal from source 8 of frequency $\omega_2$ and an input signal also of frequency $\omega_2$ from a second 98. The reference signal from source 8 is designated $Ae^{j\theta}$ while the input signal is designated $Be^{j\phi}$. It is the existing phase difference $\theta$ between $\theta$ and $\phi$ which is to be measured by the system of FIG. 8. In the embodiment of the system to be described this phase difference is displayed directly in digital form.

The reference signal is applied to the input of a resolver 100, such as those previously described in FIGS. 1–2 and 5–7. The shaft 30 of the resolver 100 is turned by a motor 102, preferably of the synchronous type, at a frequency $\omega_3$. Therefore, the output at terminal 41 of the resolver 100 is a signal of frequency $\omega_2$ whose phase is rotating at the rate $\omega_3$. This signal is given by $Ae^{j(\omega_3 t+\phi)}$. It should be understood that the phase is continuously varying from 0° to 360°. In a typical application $\omega_3$ is much lower than $\omega_2$.

The reference signal of continuously variable phase from resolver 100 is supplied to one of the isolated arms or ports 106–1 of a magic tee coupler 105. The unknown input signal of frequency $\omega_2$ to be measured is fed into the opposing arm or port 106–2 of the magic tee. Magic tee 105 is a conventional circuit component whose two output ports 106–3 and 106–4 have the sum and difference of the reference and the unknown signals applied to the two input ports 106–1 and 106–2. In this case, the difference output port 106–3 is terminated by a suitable impedance 107 and the signal at the sum output ports 106–4 is monitored for the phase information.

The sum output $O_s$ of port 106–4 is:

(1) $$O_s = \sqrt{\frac{2}{2}}[Ae^{j(\omega_3 t+\phi)} + Be^{j\theta}]$$

Expanding (1) gives:

(2) $$O_s = \sqrt{\frac{2}{2}}Ae^{j\theta}[e^{j(\omega_3 t+\phi-\theta)} + k]$$

Where $k = B/A$.

The magnitude of $O_s$ may be shown as:

(3) $$|O_s| = A\sqrt{k}\left[\frac{1+k^2}{2k} + \cos(\omega_3 t+\phi-\theta)\right]^{1/2}$$

It can be shown from (3) that a signal component at frequency $\omega_3$ exists whose phase is dependent only on $\phi+\theta$. If $$A\sqrt{k} = C_1$$

and $$\frac{1+k^2}{2k} = C_2$$

and (4) $$(\omega_3 t+\phi-\theta) = \alpha, \text{ then}$$
$$|O_s| = C_1[C_2 + \cos\alpha]^{1/2}$$

Expanding (4) in a binomial series gives:

(5) $|O_s| = k_0 + k_1\cos\alpha - k_2\cos^2\alpha + k_3\cos^3\alpha - k_4\cos^4\alpha + k_5\cos^5\alpha \ldots$ Expanding the powers of $\cos\alpha$ into its harmonics and collecting terms gives:

(6) $$O_s = k_0 - \frac{k_2}{2} + \frac{3k_4}{8} - \cdots$$
$$+ \left[k_1 + \frac{3k_3}{4} + \frac{5k_5}{5} \cdots\right]\cos\alpha$$

$$-\left[\frac{k_2}{2}+\frac{k_4}{4}+\cdots\right]\cos 2\alpha$$

$$+\left[\frac{k_3}{4}+\frac{5k_5}{16}+\cdots\right]\cos 3\alpha$$

and so on.

From (6) it can be seen that $|O_s|$ has a component at $\omega_3$ whose phase is dependent only on $\phi+\theta$.

In order to use the information at output arm 106–4 of the magic tee, a conventional tuned intermediate frequency amplifier 108 is provided so that only signal components at the carrier frequency $\omega_2$ and the slidebands at $\omega_2 \pm \omega_3$ are present at the output of the amplifier. In a typical case $\omega_2$ is in the radio frequency range, e.g., 1–100 mc., and $\omega_3$ is in the audio frequency range and may be as low as 10–100 c.p.s.

The modulated envelope output of amplifier 108 has only the terms relating to $\cos(\omega_3 t+\phi-\theta)$ and this gives a function at a frequency $\omega_3$ whose phase is dependent only upon $\phi$ and $\theta$. Since $\phi$ is the reference phase from the reference signal and remains unchanged, then any change in the phase $\theta$ at the input signal from source 98 appears as an identical phase shift at frequency $\omega_3$ at the output of amplifier 108.

To state it another way, the output of amplifier 108 is a carrier of frequency $\omega_2$ which is modulated by the components at $\cos(\omega_3 t+\phi-\theta)$. As should be clear, the quantity $\phi-\theta$ is variable with the variation being produced by changes in the phase of the signal from source 98. The lower frequency modulating envelope of $\omega_3$ will be non-sinusoidal in most cases.

The envelope at the output of amplifier 108 is detected by a suitable conventional detector 110 and applied to an amplifier 112 which is tuner to the frequency $\omega_3$ thereby amplifying only the $\omega_3$ frequency components. The output of amplifier 112 is supplied to a clipper circuit 114 which shapes the detected wave, which is a series of uni-porality pulses, to a more nearly square or rectangular form. Circuit 114 may be, for example, a suitably biased diode.

The output of the clipper 114 is applied to a differentiator circuit 116 which produces positive and negative going spikes corresponding to the leading and trailing edges of the output pulses of clipper 114. These spikes are applied to the input of a second clipper circuit 117, which may for example also be a suitably biased diode, which clips off the negative going spikes. The remaining positive going spikes, corresponding to the beginning of each detected pulse of the signal of frequency $\omega_3$ with phase information $\phi-\theta$, is used as a signal for closing the count gate of a counter 120. It should be understood that each positive going spike corresponds to a zero (base) line crossing of the beginning of each cycle of the modulating wave frequency $\omega_3$ and contains the desired phase shift information.

Counter 120 is of conventional decade construction and is calibrated to read from 0° to 360° in steps of 0.1°. Each input pulse supplied to the counter is used to advance its output count by 0.1° so it takes 3600 input pulses to produce a full counting cycle of 360°. Counter 120 may be of any suitable electromechanical or electronic configuration depending upon the counting speed needed. The counter has a gate which opens and closes, i.e., starts and stops, the counter in response to respective "open" and "close" signals. The counter is also preferably provided with a mechanical or electrical reset. Many suitable counters are available commercially, and therefore no further description thereof is necessary.

The signal of frequency $\omega_3$ for driving the synchronous motor 102 is produced by a suitable source 130 operating at a frequency $\omega_1$. Frequency $\omega_1$ is equal, for example, to $3600\times\omega_3$. The reason that the integer 3600 is utilized is so that the counter 120 may count in tenths of a degree of an angle from 0 to 360°. If greater accuracy is desired, for example hundredths of a degree of angle, then the frequency $\omega_1$ may be, for example, $36,000\times\omega_3$. If $\omega_3$ is in the order of 10–100 c.p.s., then $3600\times\omega_3$ would be 36,000 to 360,000 c.p.s. These frequencies may be readily produced with great accuracy by crystal controlled oscillators as a sine wave from source 130.

The output signal from source 130 is supplied to a 3600:1 divider 132 whose output frequency is $\omega_3$. Any suitable, conventional divder may be used for this purpose. The divider 132 output signal is amplifeid by an amplifier 134 and then applied to the motor 102 which rotates the resolver output shaft 30 at frequency $\omega_3$.

The count input of counter 120 also receives the signal of frequency $3600\times\omega_3$ from source 130. The source signal may be modified in any desired manner to operate the counter. Counter 120 counts the cycles of the signal $3600\times\omega_3$ from source 130 occurring in an interval during the time when the count gate of the counter 120 is opened by a signal applied through a differentiator circuit 140 and clipper 142 and closed by the signal from clipper 117. A differentiator circuit 140 receives the signal at frequency $\omega_3$ from divider 132 and differentiates it to produce positive and negative going spikes corresponding to the leading and tracking edge of the signal. The negative going spikes are removed by a clipper circuit 142 and the positive going spikes are used to open the count gate.

The selection of frequency $\omega_1$ such that $\omega_1=3600\times\omega_3$ and obtaining $\omega_3$ from frequency divsion of $\omega_1$ produces a time base over which $\omega_1$ can be counted up to 3600 times per unit time interval. If the count gate is opened after the 3600th cycle of $\omega_1$, corresponding to the beginning of a cycle of the $\omega_3$ signal, and if the count gate is closed by a signal from the output of the amplifier 112, this latter signal corresponding to the phase shift of $\omega_3$ produced by the phase shift $\theta$ of $\omega_2$ in the input signal from source 98, then a time between pulses to open and close the count gate is created which is linearly proportional to the phase $\theta$ to be measured.

To state it another way, the continuously operating resolver 100, which is a circularly symmetric linear phase shifter, converts the phase shift information at the high frequency $\omega_2$ to phase shift information at a lower frequency $\omega_3$. The zero base line crossing of the $\omega_3$ signal is used to close the count gate of counter 120 and thereby obtain the phase shift information over a period started at the beginning of an $\omega_3$ cycle by the pulse from clipper 142 to open the count gate. Thus, the time between zero crossings of the relatively low frequency reference signal $\omega_3$ from clipper 142 and the $\omega_3$ signal containing the phase shift component $\theta$ is measured to produce the phase shift information between the two signals of high frequency $\omega_2$. Of course any other suitable port of the $\omega_3$ signals may be used instead of the zero crossings.

If $T_3$ is the period of the rotation rate $\omega_3$ of the phase shifter 100 and $t$ is the interval between the pulses to open and close the counter 120, then by counting the number of pulses at frequency $\omega_1$ over the period $t$ a digtal readout of the phase between the two signals applied to the magic tee 105 is obtained with an angular reading of 0.1° plus or minus 0.1° over a 360° range.

Phase shifts of the input signal from source 108 can be determined relatively simply by first taking a measurement of $\theta$ and calling this "zero" phase. Any subsequent change in $\theta$ can be detected and measured to a precision of 0.1° very readily by referencing the subsequent phase measurement of $\theta$ to the "zero" phase measurement.

While preferred embodiments of the invention have been described above, it will be understood that these are illustrative only, and the invention is limited solely by the appended claims.

What is claimed is:

1. A variable resolver comprising: a housing forming a cavity, means for exciting a mode of energy within said cavity having components of circular polarization, a rotatable plane loop within said cavity for coupling out energy at a phase corresponding to the angular orientation of the loop within the cavity, and means electrically coupled to said cavity for adjusting the polarization of the energy therein by reflecting energy back into the cavity to obtain a mode of energy therein having substantially symmetric circular polarization.

2. A variable resolver comprising: a housing forming a cavity, means for exciting a mode of energy within said cavity having components of circular polarization, a rotatable plane loop within said cavity for coupling out energy at a phase corresponding to the angular orientation of the loop within the cavity, and means electrically coupled to said cavity for adjusting the polarization of the energy therein by reflecting energy back into the cavity to obtain a mode of energy therein having substantially symmetric circular polarization, said means including reactive means for controlling the phase of the reflected energy and resistive means for controlling the amplitude of the reflected energy.

3. A variable resolver for producing an output signal at any desired phase in the range from 0°–360° comprising: means for producing from a source signal a plurality of signals which differ in phase from each other, a housing forming a cavity, means for applying said plurality of signals to said cavity to excite a wave of energy therein containing components at all phases in the range from 0°–360°, means within said cavity for extracting energy at any phase angle in the range from 0°–360°, and means electrically coupled to said cavity for adjusting the polarization of the energy therein by reflecting energy back into said cavity at a desired amplitude and phase angle.

4. A variable resolver as set forth in claim 3 wherein said cavity is generally cylindrical and the reflected energy is adjusted to produce a wave therein of substantially circular polarization.

5. A variable resolver as set forth in claim 4 wherein said plurality of signals comprise four signals which are in a 90° phase sequence.

6. A variable resolver for producing an output signal at any desired phase in the range from 0°–360° comprising: means for producing from a source signal a plurality of signals which differ in phase from each other, a housing forming a cavity, said cavity having a plurality of conductive loops therein, means for applying a respective signal of different phase from said plurality of signals to a respective one of said loops to excite a wave of energy in said cavity containing components at all phases in the range from 0°–360°, means electrically coupled to said cavity for adjusting the polarization of the energy therein by reflecting energy back into the cavity at a controllable amplitude and phase angle, and a loop positionable within said cavity for producing the output signal by extracting energy at any electrical phase angle in the range from 0°–360°.

7. A variable resolver for producing an output signal at any desired phase in the range from 0°–360° comprising: means for producing from a source signal first, second, third and fourth signals of respective phases of 0°, 90°, 180° and 270° with respect to each other, a housing forming a cavity, said cavity having four conductive loops therein, means for applying said first, second, third and fourth signals to a respective loop of said cavity whereby a wave having components of circular polarization is excited therein, means including at least one of said loops electrically coupled to said cavity for reflecting energy back into said cavity at a controllable magnitude and phase angle to produce a wave of substantially symmetric circular polarization, and a substantially plane rotatable loop in said cavity for coupling out energy to produce said output signal at any phase angle in the range from 0°–360°, a change in phase of the output signal being effected by changing the angular orientation of the loop in said cavity.

8. A variable resolver for producing an output signal at any desired phase in the range from 0°–360° comprising: means for producing from a source signal a plurality of signals which differ in phase from each other, a housing forming a cavity, said cavity having a plurality of conductive loops therein, means for applying a respective signal of different phase from said plurality of signals to a respective one of said loops to excite a wave of energy in said cavity containing components at all phases in the range from 0°–360°, adjustable resistor means and capacitor means connected in parallel, means for electrically coupling said resistor and capacitor means to one of said signal loops whereby energy is reflected back into the cavity at a controlled phase angle and magnitude to produce a substantially symmetrically polarized wave of energy in said cavity, and a loop positionable within said cavity for producing the output signal by extracting energy at any electrical phase angle in the range from 0°–360°.

9. A variable resolver for producing an output signal at any desired phase in the range from 0°–360° comprising: a housing forming a cavity, said cavity having four conductive signal loops therein, first coupler means having an input port for receiving a source signal, first and second output ports for producing respective first and second signals of phases 0° and 90° with respect to each other, and a third output port substantially isolated from said first and second output ports, first and second balun transformers electrically coupled to said first and second output ports of said first coupler means for receiving the respective first and second output signals therefrom and also having outputs electrically coupled to selected ones of said signal loops within said cavity, said first balun transformer producing third and fourth signals at phases 0° and 180° and said second balun transformer producing fifth and sixth signals at phases 90° and 270° with respect to each other, said third, fourth, fifth and sixth signals exciting a polarized wave within said cavity containing components of energy at all phases in the range from 0°–360°, a compensating network electrically coupled to said third output port of said first coupler means for adjusting the polarization of the energy within the cavity to produce a substantially symmetric circularly polarized wave by reflecting energy of controlled magnitude and phase back into said cavity, and a substantially plane, rotatable output loop within said cavity for producing the output sgnal by extracting energy at any phase angle in the range from 0°–360°, a change in phase of the output signal being effected by changing the angular orientation of the loop in the cavity.

10. A resolver as set forth in claim 9 wherein said compensating network includes resistor means and capacitor means connected in parallel, said resistor means controlling the magnitude of the reflected energy and said capacitor means controlling the phase.

11. A variable resolver for producing an output signal at any desired phase in the range from 0°–360° comprising: coupler means having an input port for receiving the source signal and first and second output ports for producing respective first and second signals of phases 0° and 90° with respect to each other, a housing forming a cavity, said cavity having four conductive signal loops located therein, first and second balun transformers each having two outputs, each of said outputs being electrically coupled to one of said loops of said cavity, first and second impedance step-up transformers electrically coupling said first and second signals of phases 0° and 90° to the inputs of said first and second balun transformers, said first balun transformer producing third and fourth signals at phases 0° and 180° and said second balun transformer producing fifth and sixth signals at phases 90° and 270° with respect to each other, said third, fourth, fifth and sixth signals exciting a polarized wave within said cavity containing components of energy at all phases in the range from 0°–360°, and an output loop positionable within said cavity for producing the output signal by extracting energy at any phase angle in the range from 0°–360°, a change in phase of the output signal being effected by changing the position of the loop in the cavity.

12. A variable resolver for producing an output signal at any desired phase in the range from 0°–360° comprising: coupler means having an input port for receiving the source signal and first and second output ports for producing respective first and second signals of phases 0° and 90° with respect to each other, a housing forming a cavity, said cavity having four conductive signal loops located therein, first and second balun transformers each having two outputs, each of said outputs being electrically coupled to one of said loops of said cavity, first and second impedance step-up transformers electrically coupling said first and second signals of phases 0° and 90° to the inputs of said first and second balun transformers, said first balun transformer producing third and fourth signals at phases 0° and 180° and said second balun transformer producing fifth and sixth signals at phases 90° and 270° with respect to each other, said third, fourth, fifth and sixth signals exciting a polarized wave within said cavity containing components of energy at all phases in the range from 0°–360°, a compensating network electrically coupled to at least one of said conductive cavity loops for reflecting back energy of a controlled magnitude and phase into said cavity to produce a wave of substantially circular symmetric polarization therein, and a substantially plane, rotatable output loop within said cavity for producing the output signal by extracting energy at any phase angle in the range from 0°–360°, a change in phase of the output signal being effected by changing the orientation of the loop in the cavity.

13. A resolver as set forth in claim 12 wherein said compensating network includes resistor means and capacitor means connected in parallel, said resistor means controlling the magnitude of the reflected energy and said capacitor means controlling the phase.

References Cited

UNITED STATES PATENTS

| | | | |
|---|---|---|---|
| 2,461,832 | 2/1949 | Meacham | 328—155 |
| 2,742,642 | 4/1956 | Clapp | 333—31 |
| 2,773,254 | 12/1956 | Engelmann | 333—31 |
| 3,218,549 | 11/1965 | Tsuchiya | 324—58 |

HERMAN KARL SAALBACH, *Primary Examiner.*

M. NUSSBAUM, *Assistant Examiner.*

U.S. Cl. X.R.

323—121; 328—155